United States Patent
Sugimoto et al.

(10) Patent No.: US 9,110,323 B2
(45) Date of Patent: Aug. 18, 2015

(54) LIQUID CRYSTAL DISPLAY DEVICE

(71) Applicant: Japan Display Inc., Minato-ku (JP)

(72) Inventors: Toshikatsu Sugimoto, Minato-ku (JP); Yusuke Matsuzaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/107,630

(22) Filed: Dec. 16, 2013

(65) Prior Publication Data
US 2014/0267971 A1 Sep. 18, 2014

(30) Foreign Application Priority Data
Mar. 13, 2013 (JP) .................................. 2013-050269

(51) Int. Cl.
*G02F 1/1335* (2006.01)
*G02F 1/1333* (2006.01)
*F21V 8/00* (2006.01)

(52) U.S. Cl.
CPC ........ *G02F 1/133308* (2013.01); *G02B 6/0088* (2013.01); *G02F 1/133615* (2013.01); *G02B 6/0011* (2013.01); *G02F 1/133606* (2013.01); *G02F 2001/133322* (2013.01); *G02F 2201/54* (2013.01); *G02F 2202/28* (2013.01)

(58) Field of Classification Search
USPC ...................................................... 349/58, 65
See application file for complete search history.

(56) References Cited

U.S. PATENT DOCUMENTS

| 6,789,910 B2 * | 9/2004 | Kimura et al. | 362/600 |
| 2004/0257494 A1 * | 12/2004 | Park | 349/65 |
| 2009/0091688 A1 * | 4/2009 | Tanaka et al. | 349/65 |

FOREIGN PATENT DOCUMENTS

JP 2008-009374 A 1/2008

OTHER PUBLICATIONS

U.S. Appl. No. 14/024,805, filed Sep. 12, 2013, Sugimoto.

* cited by examiner

*Primary Examiner* — Lucy Chien
(74) *Attorney, Agent, or Firm* — Oblon, McClelland, Maier & Neustadt, L.L.P.

(57) ABSTRACT

According to one embodiment, a light guide plate includes a light guide plate main body disposed with one end side thereof opposed to a light source and convex portions provided on the both lateral portions in positions separate from the both end portions toward the center of the light guide plate main body. A frame includes fitted portions recessed in positions corresponding to the respective convex portions, into which the convex portions are to be fitted. A bonding member bonds the fitted portions and the convex portions fitted into the respective fitted portions and serves as a light-blocking member covering the interior of the fitted portions and the exterior of the convex portions.

5 Claims, 3 Drawing Sheets

LIQUID CRYSTAL DISPLAY DEVICE

INCORPORATION BY REFERENCE

The present invention claims priority under 35 U.S.C. §119 to Japanese Patent Application No. 2013-050269 filed on Mar. 13, 2013. The content of the application is incorporated herein by reference in their entirety.

FIELD

An embodiment of the present invention relates to a liquid crystal display device having a backlight with a light guide body and an optical sheet provided in a manner laminated on the light guide body closer to a liquid crystal display element.

BACKGROUND

Liquid crystal display devices are used across a wide range of industries and, taking advantage of their thinness, low power consumption, etc., are increasingly applied to mobile terminals (portable devices) such as cell-phones and tablet PCs.

Backlights used in liquid crystal display devices consist of a light source, a light guide plate, and an optical sheet, which are generally held integrally by a resin molded frame. Convex protrusions are then provided at several points on the peripheries of the optical sheet and the light guide plate in a manner fittable into concave fitted portions provided in the frame to prevent the optical sheet and the light guide plate from being displaced when an external force is applied thereto.

DETAILED DESCRIPTION

The liquid crystal display device according to the embodiment includes a liquid crystal display element, a backlight for irradiating planar light onto the liquid crystal display element, a frame, and a bonding member for bonding the frame and a portion of the backlight. The backlight includes a light source, a light guide body for converting light from the light source into planar light, and an optical sheet provided in a manner laminated on the light guide body closer to the liquid crystal display element. The frame surrounds and holds the liquid crystal display element and the backlight. The light guide body includes a light guide body base disposed with one end side thereof opposed to the light source and protrusions provided on the both lateral portions in positions separate from the both end portions toward the center of the light guide body base. The frame includes fitted portions recessed in positions corresponding to the respective protrusions, into which the protrusions are to be fitted. The bonding member bonds the fitted portions and the protrusions fitted into the respective fitted portions and serves as a light-blocking member covering the interior of the fitted portions and the exterior of the protrusions.

The arrangement according to the embodiment will hereinafter be described with reference to FIGS. 1 to 4.

Figure 1:
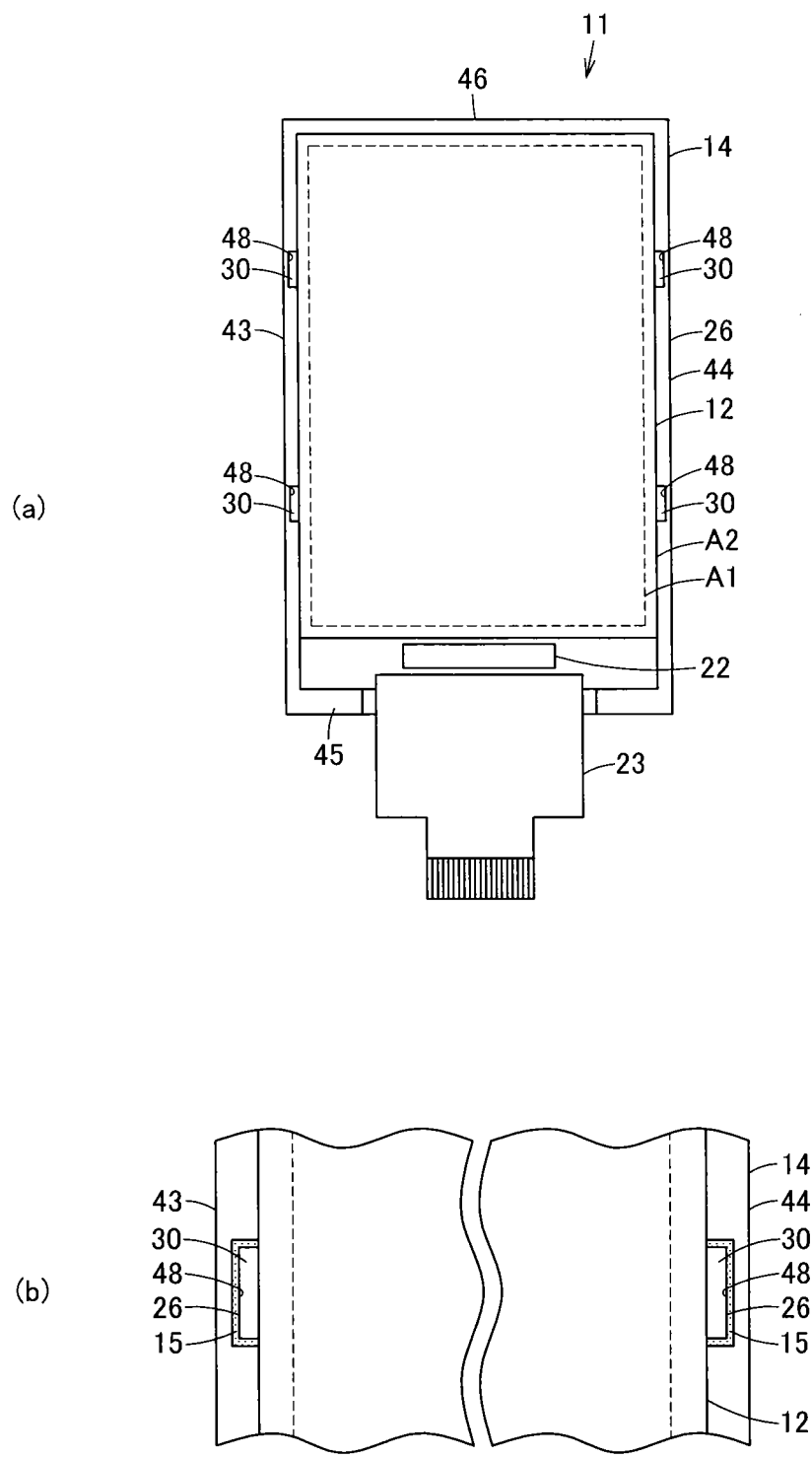
FIG. 1 is a plan view of a liquid crystal display device according to an embodiment, FIG. 1(a) showing the entire liquid crystal display device and FIG. 1(b) showing an enlarged portion of the liquid crystal display device.
Figure 2:
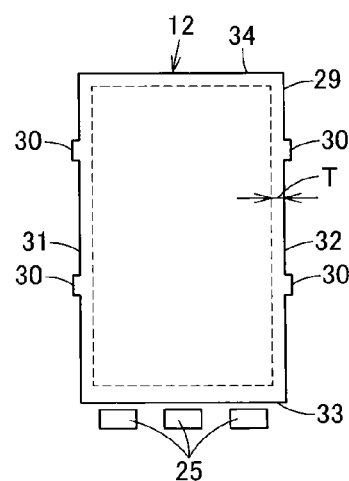
FIG. 2 is a plan view of a light guide body included in the liquid crystal display device.
Figure 3:
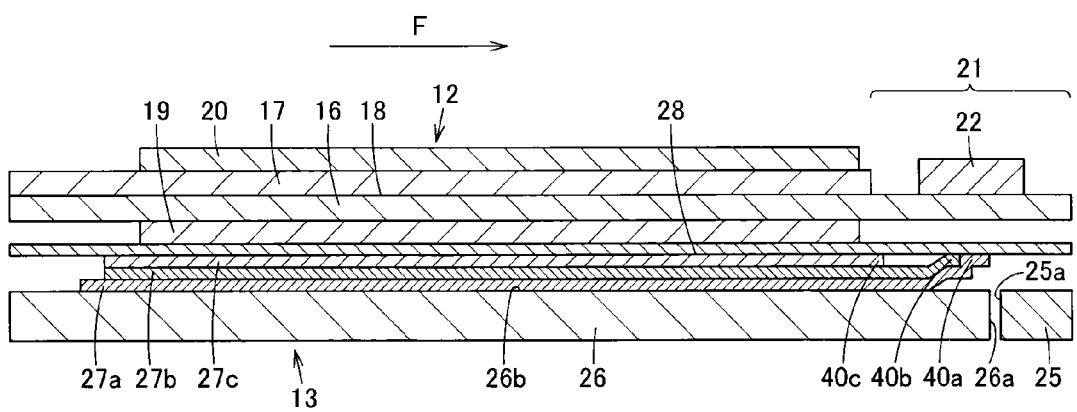
FIG. 3 is a partial cross-sectional view of the liquid crystal display device.
Figure 4:
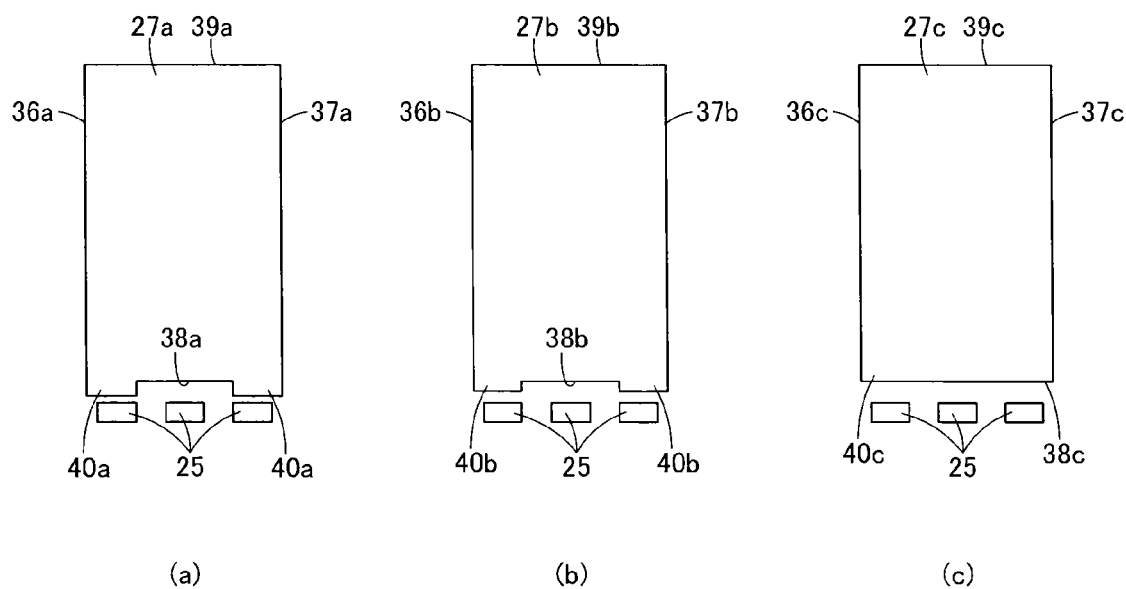
FIGS. 4(a) to 4(c) are plan views of optical sheets included in the liquid crystal display device.

In FIG. 1(a), FIG. 1(b), and FIG. 3, the reference numeral 11 denotes a liquid crystal display device, which may be used in portable devices such as cell-phones. The liquid crystal display device 11 is a so-called transmissive liquid crystal display module including a planar liquid crystal panel 12 serving as a transmissive liquid crystal display element, a backlight 13 serving as a planar light source for irradiating planar light onto the liquid crystal panel 12, a frame 14 holding the liquid crystal panel 12 and the backlight 13, and a light-blocking member 15 serving as a bonding member for bonding the backlight 13 and the frame 14.

As shown in FIGS. 1 to 4, the liquid crystal panel 12 is formed in a quadrilateral shape in plan view, including an array substrate 16 and an opposite substrate 17 disposed in a mutually opposed manner and bonded with an adhesive layer not shown, a liquid crystal layer 18 provided and sealed between the substrates 16 and 17, and polarizing plates 19 and 20 attached to the respective substrates 16 and 17. A protective plate such as a translucent cover not shown is attached on the display side, one principal surface of the liquid crystal panel 12, in a manner covering the polarizing plate 20. The liquid crystal panel 12 includes a display area A1 formed in, for example, a quadrilateral shape corresponding to the liquid crystal layer 18 and a frame area A2, a non-display area, formed in, for example, a quadrilateral frame shape to surround the display area A1. The liquid crystal panel 12 is an active matrix type one in which multiple pixels (sub-pixels) formed in a matrix in the display area A1 are switched by a switching device such as a thin film transistor so that the amount of transmission (blocking) of light from the backlight 13 is controlled, whereby images can be color-displayed thereon. In this embodiment, the liquid crystal panel 12 (liquid crystal display device 11) has a display area A1 of a 4.3-inch size, for example.

The array substrate 16 is composed of a glass substrate serving as a quadrilateral flat and light-transmissible insulating substrate and, on the principal surface thereof on the side of the liquid crystal layer 18, scan lines and signal lines are disposed in a grid-like manner with thin film transistors (TFTs) serving as switching devices provided at the intersections of the scanning lines and signal lines, which are covered with an orientation film, not shown, formed for orientation of liquid crystal molecules in the liquid crystal layer 18. The amount of transmission (blocking) of light from the backlight 13 through each pixel can then be switched by the switching feature of the thin film transistors.

The opposite substrate 17 is composed of a glass substrate serving as a quadrilateral flat and translucent insulating substrate that corresponds to the glass substrate of the array substrate 16, on which a color filter layer such as a coloring layer is formed, which is covered with a counter electrode formed as a transparent common electrode for setting a common potential for each pixel (sub-pixel), which in turn is covered with an orientation film formed for orientation of the liquid crystal layer 18. The opposite substrate 17 also has a lateral (width) dimension approximately equal to that of the array substrate 16 and a longitudinal dimension smaller than that of the array substrate 16. The opposite substrate 17 is then bonded to the array substrate 16 with the long sides and one short side thereof being aligned with those of the array substrate 16. With this arrangement, the opposite substrate 17 has a non-facing area (drive area) 21 not faced to the array substrate 16 around the other short side. In this non-facing area 21, a driver IC 22 is mounted serving as a control circuit to generate a signal for controlling each pixel (thin film transistor), to which a flexible circuit board 23 for electrically connecting the driver IC 22 and an external circuit is electrically connected using, for example, an anisotropic conductive film (ACF).

In the color filter layer, coloring portions of R (red), G (green), B (blue), etc., made of, for example, synthetic resin are formed in a striped manner corresponding to each pixel (sub-pixel). It is noted that if the liquid crystal panel 12 does not perform color display, for example, a monochrome display, there is no need to provide such a color filter layer. The color filter layer may be provided on the array substrate 16.

The backlight 13 includes multiple (semiconductor) light sources 25 such as LEDs, a light guide plate 26 serving as a quadrilateral flat light guide body for converting light from the light sources 25 into planar light, and (first to third) optical sheets 27a, 27b, and 27c for uniformizing light emitted from the light guide plate 26. The liquid crystal panel 12 (polarizing plate 19) and the backlight 13 (third optical sheet 27c) are then bonded using, for example, a double-sided adhesive tape 28 formed in a quadrilateral frame shape in plan view.

The light sources 25 are each provided separately from the light guide plate 26 with the light emitting surface 25a thereof being opposed to the light incident surface 26a, one end face on one short side of the light guide plate 26. The light sources 25 are also disposed separately from each other at approximately equal intervals along the light incident surface 26a of the light guide plate 26.

The light guide plate 26 is made of, for example, synthetic resin and integrally includes a light guide plate main body 29 serving as a light guide body base having approximately the same size and, in this embodiment, approximately the same quadrilateral shape as the liquid crystal panel 12 and multiple convex portions 30, ear portions, serving as protrusions provided in a manner protruding from the light guide plate main body 29. The light guide plate 26 is then disposed such that the light emitting surface 26b, one principal surface, is opposed to the dorsal side of the liquid crystal panel 12.

The light guide plate main body 29 has a pair of opposed long sides 31 and 32 and a pair of opposed short sides 33 and 34. The long sides 31 and 32 (and the short sides 33 and 34) of the light guide plate main body 29 are positioned outside of the display area A1 by a predetermined dimension T, for example, 0.4 mm or more. That is, the frame area A2 is formed to have a width of the predetermined dimension T along the outer edge of the light guide plate main body 29.

The convex portions 30 are provided in a quadrilateral shape in a manner protruding from the long sides 31 and 32 of the light guide plate main body 29. The convex portions 30 are disposed on the both lateral portions, that is, the long sides 31 and 32 of the light guide plate main body 29 in (four) positions separate from the positions continued to the both end portions, that is, the short sides 33 and 34 toward the center. In other words, the convex portions 30 are provided in a manner protruding from the long sides 31 and 32 in positions separate from the corners of the light guide plate main body 29 and in the vicinity of the longitudinal center of the light guide plate main body 29 separately on one and the other end sides with respect to the longitudinal center.

The optical sheets 27a, 27b, and 27c are each made of, for example, synthetic resin, formed in a quadrilateral shape, and laminated successively to cover the light emitting surface 26b of the light guide plate 26. That is, the optical sheets 27a, 27b, and 27c are provided between the light guide plate 26 (light emitting surface 26b) and the liquid crystal panel 12. The optical sheets 27a, 27b, and 27c further have, respectively, a pair of opposed long sides 36a and 37a, 36b and 37b, 36c and 37c, and a pair of opposed short sides 38a and 39a, 38b and 39b, 38c and 39c. The long sides 36a, 37a, 36b, 37b, 36c, and 37c are disposed along the respective long sides 31 and 32 of the light guide plate 26, while the short sides 38a, 39a, 38b, 39b, 38c, and 39c are disposed along the respective short sides 33 and 34 of the light guide plate 26. In addition, the short sides 38a, 38b, and 38c of the optical sheets 27a, 27b, and 27c are opposed to the light sources 25 sides. That is, the short sides 38a, 38b, and 38c of the optical sheets 27a, 27b, and 27c are provided along the light incident surface 26a of the light guide plate 26. Further, the short sides 38a, 38b, and 38c of the optical sheets 27a, 27b, and 27c extend out of the display area A1 of the liquid crystal panel 12 toward the light sources 25. The both lateral portions of the extending short sides 38a and 38b, that is, the portions continued to the long sides 36a, 37a, 36b, and 37b and the vicinity of the short side 38c inclusive extend toward the light sources 25 to serve, respectively, as stuck portions 40a, 40b, and 40c stuck with the double-sided adhesive tape 28. It is noted that the first optical sheet 27a is, for example, a diffusion sheet, while the second and third optical sheets 27b and 27c are, for example, prism sheets. The first optical sheet 27a is laminated directly on the light emitting surface 26b of the light guide plate 26, the second optical sheet 27b is laminated directly on the first optical sheet 27a, and the third optical sheet 27c is laminated directly on the second optical sheet 27b and bonded wholly to the double-sided adhesive tape 28.

The frame 14 is made of synthetic resin and integrally molded in a bottomed rectangular cylindrical shape (quadrilateral frame shape) to form a frame portion surrounding the liquid crystal panel 12 and the backlight 13. That is, the frame 14 integrally includes a pair of frame long sides 43 and 44 and a pair of frame short sides 45 and 46. Quadrilateral fitted portions 48 into which the respective convex portions 30 of light guide plate 26 are to be fitted are then provided in a recessed manner in positions on the pair of respective frame long sides 43 and 44 of the frame 14 closer to the frame short side 45, with respect to the longitudinal center, in other words, in the vicinity of the frame short side 45. It is noted that the frame 14 may be built separately in, or formed integrally with a bezel not shown in a manner covering the liquid crystal panel 12 with at least the display area A1 being exposed.

The light-blocking member 15 is, for example, a black light-blocking double-sided adhesive tape provided between the interior of the fitted portions 48 and the exterior of the convex portions 30 of the light guide plate 26 of the backlight 13 to bond the fitted portions 48 and the convex portions 30. That is, the light-blocking member 15 covers the interior of the fitted portions 48 and the exterior of the convex portions 30 (FIG. 1 (b)).

In the process of assembling the liquid crystal display device 11, the light sources 25 and the light guide plate 26 are first arranged and held with respect to the preliminarily molded frame 14. In this step, the light guide plate 26 is installed such that the convex portions 30 are fitted into the respective fitted portions 48 with one surface of the light-blocking member 15 stuck with the interior thereof, so that the light-blocking member 15 bonds the fitted portions 48 and the convex portions 30. As a result, the exterior of the convex portions 30 and the interior of the fitted portions 48 are covered with the light-blocking member 15.

Next, the substrates 16 and 17 are bonded to each other with the liquid crystal layer 18 provided therebetween and the driver IC 22 and the flexible circuit board 23, etc., are mounted, and the optical sheets 27a, 27b, and 27c are bonded, using the double-sided adhesive tape 28, to the liquid crystal panel 12 preliminarily formed by attaching the polarizing plates 19 and 20. In this step, the entire outer edge portion of the third optical sheet 27c is bonded, including the short side 38c (stuck portion 40c), to the double-sided adhesive tape 28, while the first and second optical sheets 27a and 27b are bonded to the double-sided adhesive tape 28 via the respective stuck portions 40a and 40b including the short sides 38a and 38b.

Further, the liquid crystal panel 12 and the optical sheets 27a, 27b, and 27c are attached and held onto the frame 14 in such a manner that the optical sheets 27a, 27b, and 27c are laminated on the light emitting surface 26b of the light guide plate 26 to complete the liquid crystal display device 11.

Light emitted from the light emitting surface 25a of each light source 25 is made incident into the light incident surface 26a of the light guide plate 26 and then converted into planar light across the light guide plate 26, and thereafter uniformized through the optical sheets 27a, 27b, and 27c to be fed to the dorsal side of the liquid crystal panel 12. In addition, in the display area A1 of the liquid crystal panel 12, the amount of transmission (blocking) of planar light from the backlight 13 through each pixel driven corresponding to an image signal is set to display an image to the observer.

In the above-described embodiment, since the light-blocking member 15, which is used to bond the convex portions 30 provided in a manner protruding from the both lateral portions (long sides 31 and 32) in positions separate from the both end portions (short sides 33 and 34) of the light guide plate main body 29 toward the center and the fitted portions 48 recessed in the frame long sides 43 and 44 of the frame 14 into which the respective convex portions 30 are to be fitted, covers the interior of the fitted portions 48 and the exterior of the convex portions 30, light likely to leak from the convex portions 30 of the light guide plate 26 toward the fitted portions 48 of the frame 14 is absorbed (attenuated) through the light-blocking member 15 not to be reflected at the fitted portions 48. Thus, light leakage (lighting) at the positions of the convex portions 30 is less likely to occur.

That is, light leakage at the positions of the convex portions 30 has conventionally been prevented by covering with optical sheet protrusions provided, with a shape larger than that of the convex portions 30, on the long sides 36a, 37a, 36b, 37b, 36c, and 37c of the optical sheets 27a, 27b, and 27c in positions corresponding to the respective convex portions 30 to be fitted into the respective fitted portions 48 to prevent the optical sheets 27a, 27b, and 27c from being displaced. In addition, the convex portions 30 and the optical sheet protrusions have been disposed at the corners of the light guide plate main body 29 and the optical sheets 27a, 27b, and 27c to reduce the amount of light leakage. It has therefore been necessary to set the size of the fitted portions 48 of the frame 14 equal to the size of the optical sheet protrusions as well as to position the fitted portions 48 at the corners of the frame 14, possibly leading to a reduction in the strength of the frame 14. In order to address this, no optical sheet protrusion is provided on the optical sheets 27a, 27b, and 27c in this embodiment and, as described above, light leakage can be prevented with the light-blocking member 15 even without disposing the convex portions 30 at the corners of the light guide plate main body 29, whereby it is possible to set the size of the fitted portions 48 of the frame 14 equal to the size of the convex portions 30, which is smaller than that of the optical sheet protrusions, as well as not to position the fitted portions 48 of the frame 14 at the corners. It is therefore possible to prevent reduction in the strength of the frame 14 even if the frame is made narrow. As a result, without increasing the thickness, the frame 14 can be less likely to be deformed during assembly of the liquid crystal display device 11 as well as to undergo warpage even with an increase in the size of the display area A1. The dimensional accuracy can therefore be maintained and the frame 14 can thus be less likely to be deformed during assembling of the liquid crystal display device 11 (backlight 13), resulting in increased ease of assembly.

Furthermore, although the optical sheets 27a, 27b, and 27c have no optical sheet protrusion having a function of preventing displacement as described above, the stuck portions 40a, 40b, and 40c extending toward the light sources 25 are stuck with the double-sided adhesive tape 28, which bonds the backlight 13 and the liquid crystal panel 12. Accordingly, even when the liquid crystal display device 11 may be dropped accidentally, for example, and applied with an impact and therefore a locally great stress (force F), the stress can be supported, that is, the load can be dispersed by the stuck portions 40a, 40b, and 40c stuck with the double-sided adhesive tape 28, the stuck portions 40a, 40b, and 40c causing the optical sheets 27a, 27b, and 27c to have their respective different lengths. The optical sheets 27a, 27b, and 27c can thus be prevented effectively from being displaced with no optical sheet protrusion. It is therefore possible to provide the liquid crystal display device 11 having a sufficient strength whereby the display quality can be prevented effectively from being deteriorated even when it may be dropped accidentally.

That is, it is possible to provide the liquid crystal display device 11 with increased ease of assembly of the backlight 13 while preventing the optical sheets 27a, 27b, and 27c and the convex portions 30 of the light guide plate 26 from being displaced during assembling as well as the display quality from being deteriorated (solving problems with display) due to, for example, lighting of the convex portions 30 depending on the angle of vision.

Since it is also required to neither add components nor change materials separately, the optical properties of the liquid crystal display device 11 are not affected.

It is noted that in the above-described embodiment, the number of optical sheets is not limited to three.

Further, the liquid crystal panel 12 may be, for example, a semi-transmissive type.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A liquid crystal display device comprising:
a liquid crystal display element;
a backlight including a light source, a light guide body for converting light from the light source into planar light, and an optical sheet provided in a manner laminated on the light guide body closer to the liquid crystal display element, the backlight arranged to irradiate planar light onto the dorsal side of the liquid crystal display element;
a frame surrounding and holding the liquid crystal display element and the backlight; and
a bonding member for bonding the frame and a portion of the backlight, wherein the light guide body includes:

a light guide body base disposed with one end side thereof opposed to the light source; and protrusions provided on the both lateral portions in positions separate from the both end portions toward the center of the light guide body base, and wherein the frame includes fitted portions recessed in positions corresponding to the respective protrusions, into which the protrusions are to be fitted, and wherein the bonding member bonds the fitted portions and the protrusions fitted into the respective fitted portions and serves as a light-blocking member covering the interior of the fitted portions and the exterior of the protrusions, and wherein the light guide body base is formed in a quadrilateral shape having a pair of long sides in the both lateral portions and a pair of short sides in the both end portions, and wherein the protrusions are provided separately in pairs on each of the long sides in positions separate from the short sides, and wherein the light-blocking member absorbs light leaking from the protrusions towards the fitted portions.

2. The liquid crystal display device according to claim 1, further comprising a double-sided adhesive tape bonding the backlight and the liquid crystal display element, wherein the optical sheet includes a stuck portion provided on the side closer to the light source and stuck with the double-sided adhesive tape.

3. The liquid crystal display device according to claim 1, wherein the light source is an LED.

4. The liquid crystal display device according to claim 1, wherein the light-blocking member is a black light-blocking double-sided adhesive tape.

5. The liquid crystal display device according to claim 1, wherein the optical sheet includes one diffusion sheet and two prism sheets.

\* \* \* \* \*